United States Patent [19]

Mecham

[11] 4,278,191
[45] Jul. 14, 1981

[54] SPARE TIRE CARRIER

[76] Inventor: Lynn Mecham, 465 W. 800 South, Alpine, Utah 84003

[21] Appl. No.: 102,248

[22] Filed: Dec. 10, 1979

[51] Int. Cl.³ .............................................. B62D 43/04
[52] U.S. Cl. ................................ 224/42.21; 414/465; 414/466; 224/42.23
[58] Field of Search ............... 224/42.21, 42.23, 42.26, 224/42.28, 42.29, 42.41, 42.06; 414/463, 465, 466; 296/37.2

[56] References Cited

U.S. PATENT DOCUMENTS

| 2,479,155 | 8/1949 | Clark | 414/465 |
| 2,574,465 | 11/1951 | Clark | 224/42.21 X |
| 2,674,393 | 4/1954 | Clark | 414/465 |
| 3,223,263 | 12/1965 | Fielding | 414/466 |
| 3,330,430 | 7/1967 | Knecht | 414/466 |
| 3,620,396 | 11/1971 | Abfalter | 414/466 |
| 3,883,018 | 5/1975 | Hoisington | 224/42.21 X |
| 4,047,629 | 9/1977 | Klein | 224/42.21 X |
| 4,095,709 | 6/1978 | Eller | 224/42.21 X |

FOREIGN PATENT DOCUMENTS 749561 7/1933 France.

Primary Examiner—Steven M. Pollard
Attorney, Agent, or Firm—M. Reid Russell

[57] ABSTRACT

The present invention constitutes a carrier for maintaining a spare tire to a vehicle, such as a pickup truck so as to be easily accessible, that comprises a lifting arm assembly which is secured to the vehicle bumper or frame and incorporates a screw arrangement therewith. The screw arrangement is turned manually and operates through a linkage to raise or lower a support bar assembly that mounts a platform whereon the spare tire is maintained. The lifting arm assembly can be pivoted to move the platform and tire between a storage area beneath the vehicle frame and to a point beyond the vehicle bumper whereby the tire and platform can serve also as a step for facilitating entry into the back of the truck or into a camper mounted thereon.

11 Claims, 5 Drawing Figures

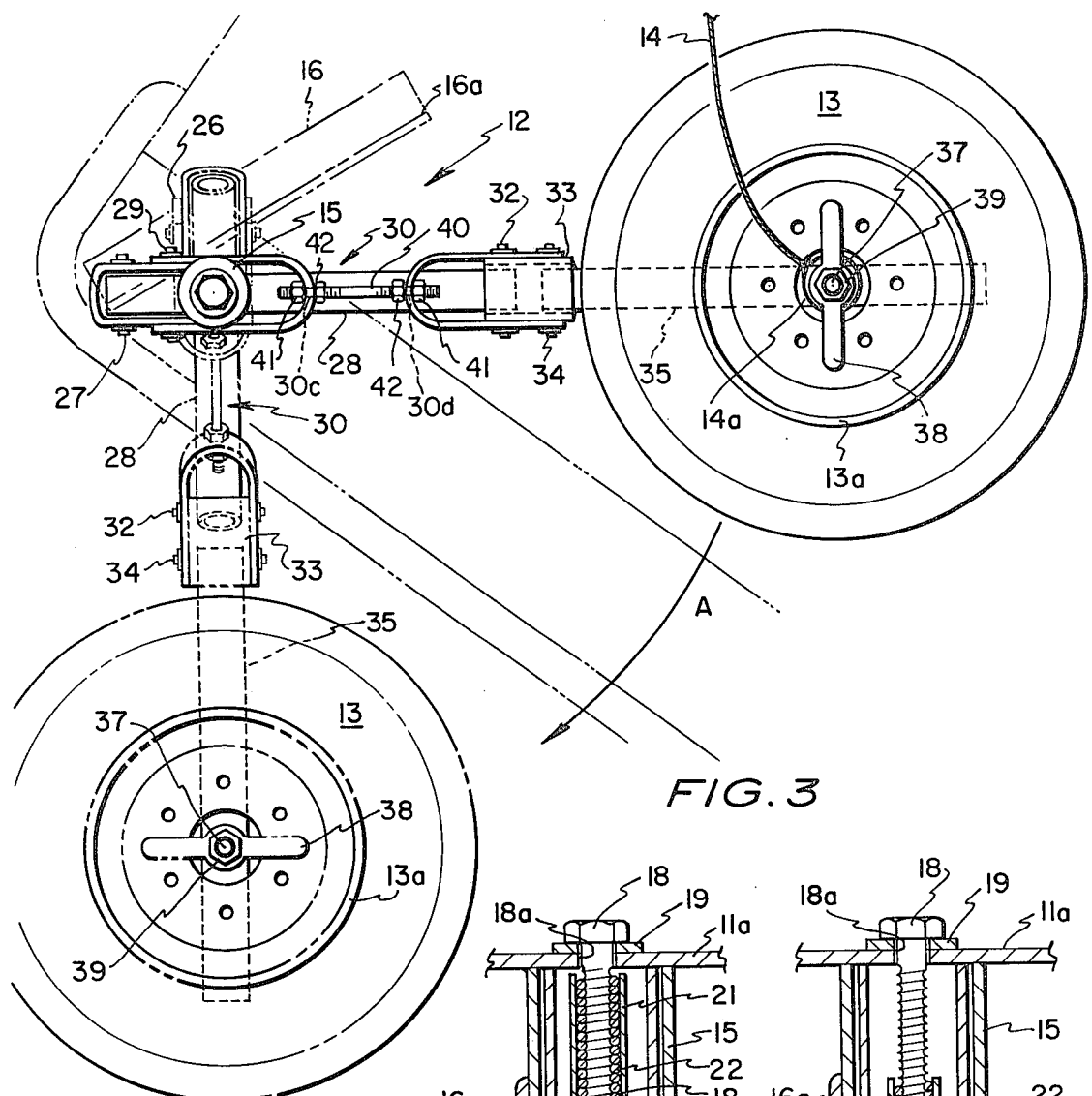
FIG. 3
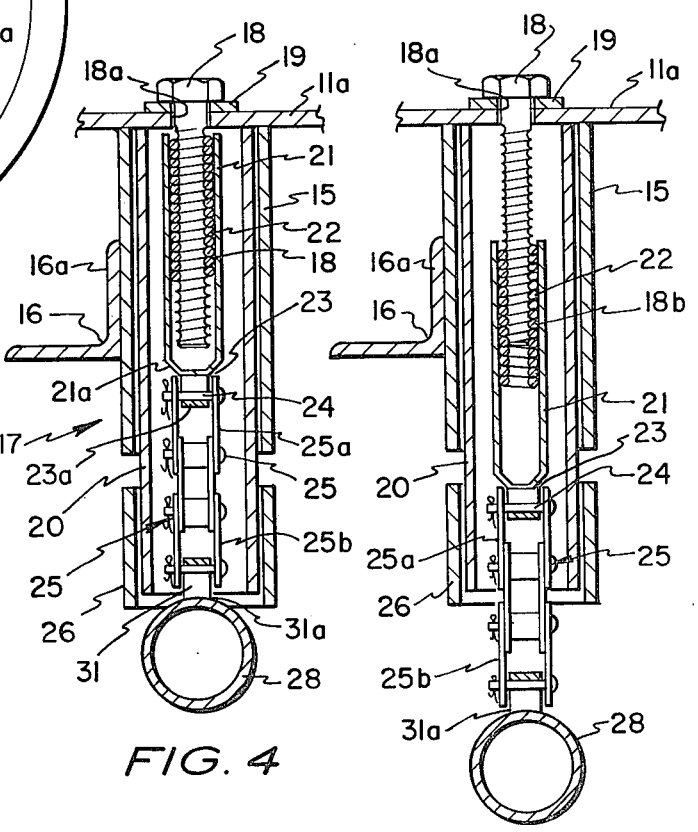
FIG. 4
FIG. 5

SPARE TIRE CARRIER

DESCRIPTION OF THE INVENTION

1. Field of the Invention

This invention relates to a spare tire carrier arrangements, particularly those appropriate for a truck or truck-type vehicle.

2. Prior Art

A problem common to trucks, and particularly in trucks mounting campers, or the like, is to find an appropriate and convenient place for maintaining a spare tire. Particularly with a vehicle that mounts a camper thereon, space is at a premium. Therefore, it is not uncommon to see a camper-carrying vehicle mounting a spare tire on the front bumper that partially blocks the vehicle radiator. Further, such a vehicle that mounts a camper, as it rides high off the ground, often requires the inclusion of a separate step arrangement for providing easy access into that camper. The present invention provides a simplistic solution to both the need for a convenient spare tire carrier and step combination.

The present invention is, therefore, believed to be both novel and unique and a significant improvement in the art.

SUMMARY OF THE INVENTION

It is a principal object of the present invention to provide a spare tire carrier for pivotal coupling to a vehicle bumper or frame for maintaining a spare tire therewith whereby that spare tire can be moved vertically and pivoted between a recessed attitude beneath the vehicle and out from beneath the vehicle beyond the vehicle bumper.

Another object of the present invention is to provide a spare tire carrier that, with a spare tire maintained thereon, can function as a step for assisting a person climbing into the truck bed or into a camper mounted thereon.

Another object of the present invention is to provide a spare tire carrier arranged for pivotal coupling to a bumper or frame of a conventional truck, or a like vehicle, that is manually operated to raise and lower a tire-carrying platform therewith between the ground and a stowed attitude beneath the truck that also provides for pivoting of the tire-carrying platform out from beneath the truck.

Another object of the present invention is to provide a lifting assembly for a spare tire carrier that is screw-operated through a chain linkage so as to raise and lower a beam and arm assembly therewith, lifting or lowering also a tire-carrying platform.

Still another object of the present invention is to provide a spare tire carrier that can be easily installed to a conventional truck bumper or frame, or the bumper or frame of a like vehicle, that is manually operated by appropriate turning of a single screw to raise or lower a tire-carrying platform thereof.

Still another object of the present invention is to provide a spare tire carrier that is inexpensive to construct, is simple to assemble and install, and yet will provide a long and useful service life.

Principal features of the present invention in a spare tire carrier include a tube support that is secured along the outer surface thereof, as by welding, through and to a conventional truck, or like vehicle, bumper, to extend thereacross at a normal angle between the top and bottom surfaces thereof. The tube support contains a chamber that has an internally thread configuration wherein a lifting screw or bolt is turned. The chamber is attached at its one end to the end of a chain and is arranged in the tube such that, by appropriate turning of the lifting bolt, the chamber and connected chain will be raised or lowered appropriately. A lower chain link includes a pin therethrough whose ends extend beyond the link body to support a hanger journaled thereon. The hanger, along a bottom surface thereof, is secured, as by welding, to a support bar such that the support bar will move therewith. In turn, one support bar end is pivotally coupled to a lifting pivot block and the other end is pivotally coupled to a platform pivot block. A leveling arm is also pivotally connected at its ends between the lifting and platform pivot blocks to stabilize the assembly and the lifting pivot block is secured, as by welding, to a guide sleeve that telescopes into the tube support. The platform pivot block has secured thereto a tire rack or platform.

So arranged, by appropriate turning of the lifting bolt as with a wrench, crank, or the like, the chamber and connected chain will be lifted or lowered appropriately as will the hanger connected thereto whose movement lifts or lowers the support bar appropriately. The support bar connected to the hanger is thereby pivoted appropriately at its ends at the lifting and platform pivot blocks. The respective vertical attitudes of the pivot blocks will be maintained by the leveling arm whereby, as the tire rack is raised or lowered by movement of the support bar, a desired ground parallel attitude is maintained during that travel.

The lifting bolt turned in the chamber provides also a pivotal coupling of the tire rack or platform lifting assembly to the truck bumper such that the tire rack or platform can be moved between a stowed attitude beneath the truck bed to a point beyond the truck bumper. Such provides an operator with access to the spare tire and allows the tire on the tire rack or platform to be used as a step.

Further objects and features of the present invention will become more apparent from the following detailed description taken together with the accompanying drawings.

THE DRAWINGS

FIG. 1, is an end view of a rear section of a conventional pickup truck with portions of the bumper broken away showing the present invention in a spare tire carrier arranged in a tire-stowed attitude with a conventional tire shown mounted on a tire rack or platform portion thereof;

FIG. 2, a view like that of FIG. 1 only showing the tire rack or platform lowered to a ground-engaging attitude;

FIG. 3, a top plan sectional view taken along line 3—3 of FIG. 1 showing the spare tire carrier of the present invention in both a stowed attitude where the tire carried thereon is beneath a truck bed and in another attitude the carrier has been pivoted beyond the truck bumper;

FIG. 4, a sectional view taken along the line 4—4 of FIG. 1 excluding a leveling arm portion, showing a lifting arm assembly of the present invention in a fully-elevated attitude whereat the tire rack or platform is in a tire-stowed attitude; and FIG. 5, a sectional view taken along the line 5—5 of FIG. 2, excluding a leveling arm portion, showing the lifting arm assembly of the present invention in a lowered attitude whereat the tire rack or platform is in a ground-engaging attitude.

DETAILED DESCRIPTION

Figure 1:
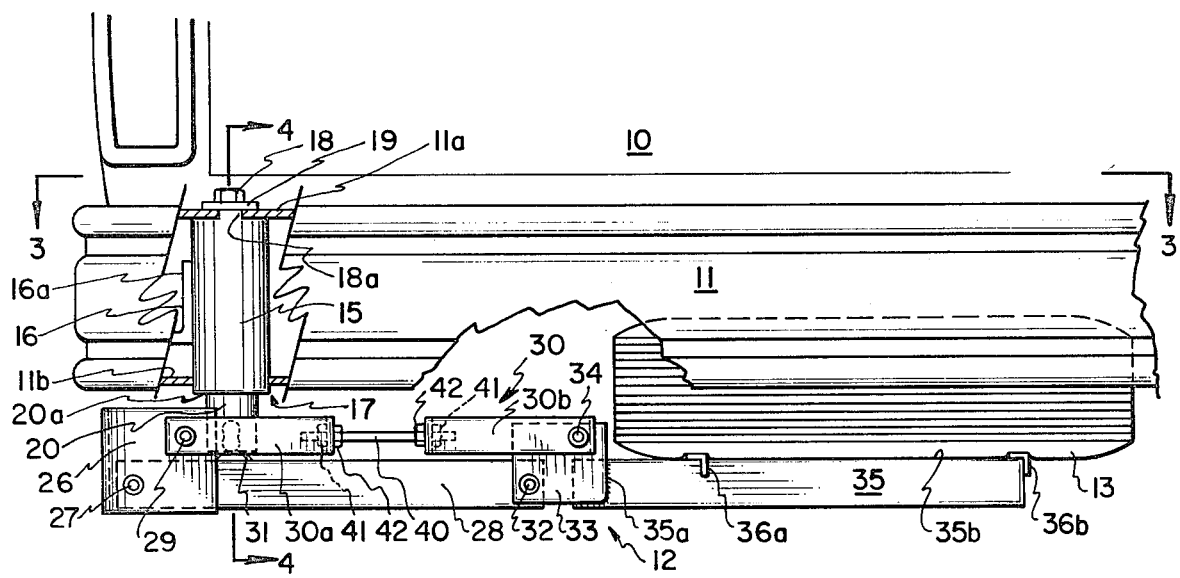

Referring now to the drawings:

In FIG. 1 is shown a left-rear portion of a truck 10 that should be taken as being a conventional pickup truck, or a like vehicle. Truck 10 is shown therein as having a bumper 11 secured thereto. Bumper 11, as shown in FIG. 1, has had several sections removed therefrom to expose the present invention in a spare tire carrier 12. Shown in FIG. 1, the spare tire carrier 12 of the present invention, whose operation will be explained in detail later herein, is shown in a lifted attitude with a spare tire 13, hereinafter referred to as tire, carried thereon, in a stowed attitude beneath truck 10. The tire 13, in its stowed attitude, it should be understood, is preferably maintained thereto with a safety cable, chain, or the like. Such a safety cable 14 that has an end loop 14a wherethrough a tire lock bolt 37 is fitted to hold the tire 13 and the spare tire carrier 12 to the vehicle, is shown in FIG. 3.

Figure 2:
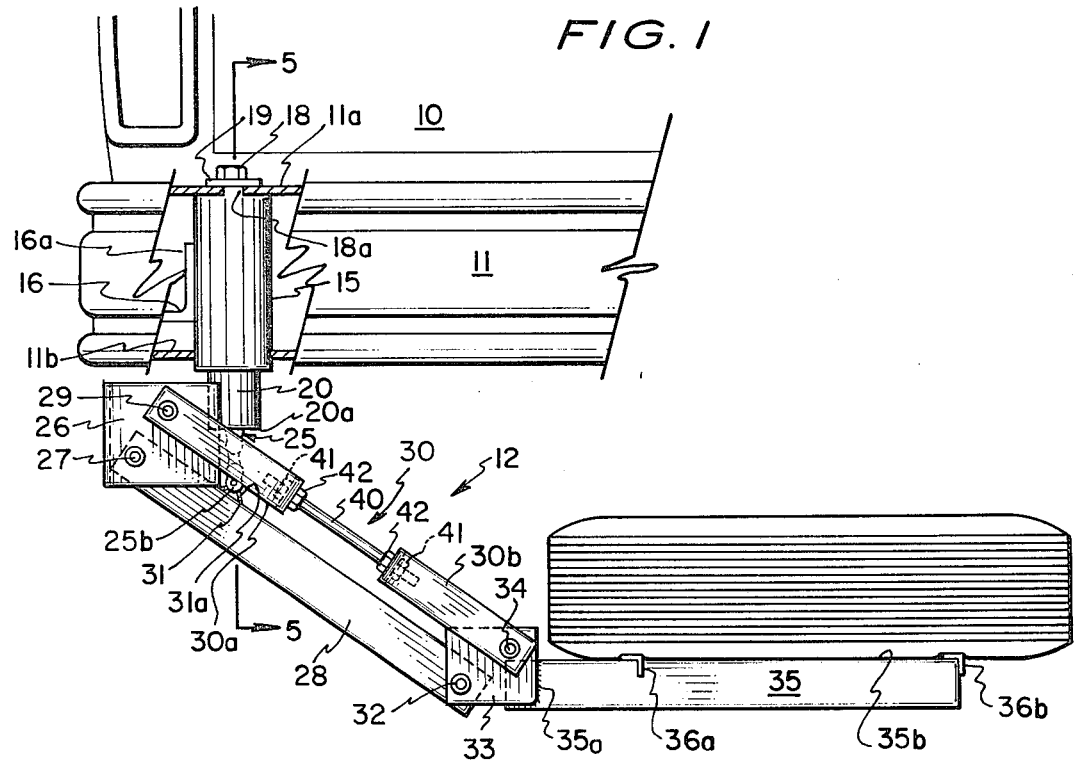

In FIG. 2, the present invention in a spare tire carrier 12 is shown with the tire 13 lowered to a ground-engaging or ground proximate attitude. In FIG. 3, the spare tire carrier 12 is shown both in a stowed attitude, beneath the bed of truck 10, and as having been pivoted, as shown by arrow A, to an attitude where the tire 13 is positioned beyond the truck bumper 11.

Turning again to FIG. 1, spare tire carrier 12 of the present invention is preferably attached to bumper 11 by forming an appropriate hole through a bottom portion 11b of that bumper. A hole 18a is also formed through bumper top 11a to accommodate a lifting bolt 18 fitted therethrough that passes into a tube support 15. The tube support 15 is fitted and secured, as by welding, or the like, in the bumper 11 to open through the hole formed in bumper bottom 11b. Preferably, the tube support 15 is secured also to an upright leg 16a of an angle-iron brace 16 that, as shown in broken lines in FIG. 3, is secured to the truck bumper and truck frame to provide another attachment point thereto to add strength to the assembly. So arranged, tube support 15 is rigidly mounted to truck bumper 11 and provides a passage therethrough for installation of a lifting arm assembly 17 of the present invention. Lifting arm assembly 17 consists of the lifting screw or bolt 18, hereinafter referred to as bolt 18, that is fitted through hole 18a in bumper top 11a and extends longitudinally into the tube support 15. A washer 19 functioning as a friction-reducing device may be sandwiched between the bolt 18 head undersurface and the bumper top 11a.

FIGS. 4 and 5 show the lifting arm assembly 17 in sectional views with the bottom 11b of bumper 11 removed to expose bolt 18 extending longitudinally within both the support tube 15 and a guide sleeve 20 and turned into a lifting chamber 21. Shown therein, a threaded portion 18b of bolt 18 is turned into a coil spring 22 that is secured as by welding or the like, within lifting chamber 21. While the lifting chamber 21 could be appropriate internally threaded to accommodate the threads 18b of bolt 18, preferably, to provide a large thread-to-thread contact surface area, the present invention includes the coil spring 22, shown in FIGS. 4 and 5. So arranged, by appropriately turning the bolt 18, as with a wrench, or the like appropriate tool, not shown, the threads 18b thereof turn in the coil spring 22 in the lifting chamber 21 to appropriately raise or lower the lifting chamber between the attitudes shown in FIGS. 4 and 5. Shown in FIGS. 4 and 5, lifting chamber 21, across a base 21a thereof, has a yoke 23 secured thereto that includes an open apex 23a wherethrough a pin 24 of a top link 25a of chain 25 is installed to provide a coupling that is capable of pivoting in a vertical plane. So arranged, as will be discussed in detail later herein, a support bar 28 is thereby pivotally linked through chain 25 to lifting chamber 21 such that the chain 25, as per the above, can pivot to accommodate support bar 28 movement.

Additionally, as part of the lifting arm assembly 17, as shown best in FIGS. 1 and 2, the guide sleeve 20 includes a lifting pivot block 26 that is secured thereto, as by welding, or the like. The lifting pivot block 26, in turn, is secured to extend longitudinally along the guide sleeve from the bottom 20a thereof upwardly. The lifting pivot block is, in turn, pivotally connected by a pivot 27 to support bar 28 and at pivot 29 to a leveling arm 30.

As per the above discussion, appropriate turning of bolt 18 will move chamber 21 and the attached yoke 23 vertically, the pivotally connected chain 25 traveling therewith. Chain 25, in turn, includes a lower link 25b whose cross pin portion has a hanger 31 fitted therethrough that is, in turn, secured along edges 31a thereof to the support bar 28. So arranged, vertical movement of the chamber 21, as described, lifts or lowers support bar 28 connected thereto, with the support bar 28 pivoting at pivot 27 to the lifting pivot block 29 and at pivot 32 to a platform pivot block 33 whereto the leveling arm 30 is also pivotally connected at 34.

Shown best in FIGS. 1 and 2, a tire rack or platform 35 is preferably secured along a weld 35a to the platform pivot block 33 so as to extend outwardly therefrom. Tire platform 35 preferably includes tire support members 36a and 36b that extend thereacross whereon tire 13 is supported. Preferably, support members as shown, are angle-irons that are secured across a tire platform top surface 35b. As shown best in FIG. 3, tire platform 35 also preferably incorporates a bolt 37 or like member that is secured to the platform so as to extend vertically from approximately the center thereof. The bolt 37 is intended to be fitted through a center opening of a hub 13a of tire 13 with a bar 38 fitted thereover across that center opening in hub 13a sandwiching the hub between the bar and platform 35. Thereafter, an appropriate nut 39 can be turned over a threaded end of bolt 37 so as to maintain the hub and tire on tire platform 35 with the tire resting on support members 36a and 36b.

Shown in FIGS. 1 and 2, the support bar 28, as stated above, is pivotally coupled to both the lifting pivot block 26 and platform pivot block 33. Th leveling arm 30 maintains the tire platform 35 in the attitudes shown in FIGS. 1 and 2 and, by an appropriate length adjustment thereto, a desired ground parallel attitude of tire platform 35 can be maintained during raising and lowering thereof. To provide the desired length adjustment, as shown best in FIGS. 1 and 2, leveling arm 30 preferably includes sub-arms 30a and 30b that are connected, respectively, by pivot 29 to lifting pivot block 26 and by pivot 34 to platform pivot block 33. A threaded rod 40 is included to extend between the sub-arms 30a and 30b that is turned into nuts 41, shown in broken lines in FIGS. 1 and 2, that are secured across the sub-arm ends opposite to the pivot couplings. By turning rod 40 through sub-arm end openings 30c and 30d into nuts 41 as shown in FIGS. 2 and 3, the leveling arm 30 length can be adjusted appropriately. Locking of the rod and sub-arms is then provided by turning lock nuts 42 against the sub-arms ends.

In operation, an operator, not shown, by turning bolt 18, appropriately as with a wrench, or like tool, not shown, can raise or lower the spare tire carrier 35 between the attitudes shown in FIGS. 1 and 2. Bolt 18, as described, turns within a coil spring 22, as shown best in FIGS. 4 and 5, to simultaneously raise or lower the lifting chamber 21, connected chain 25, and connected support bar 28. During such raising or lowering, the guide sleeve 20 will remain essentially in its original attitude maintaining the lifting pivot block 26 in essentially a stationary attitude. Lifting pivot block 26 is also essentially stationary with the support bar 28 and leveling arm 30 pivoting at 27 and 29, respectively, to lower the platform pivot block 33 to the attitude shown in FIG. 2. The length of the leveling arm 30, as stated, controls the attitude of the tire platform 35, a proper length adjustment of leveling arm 30 resulting in the tire platform 35 maintained in essentially a desired ground parallel attitude during vertical movement thereof.

The present invention in a tire support rack 12, as described, is preferably hung by bolt 18 from the truck bumper 11, so as to provide also a pivoting connection whereby the support bar 28, leveling arm 30 and tire platform 35 can be pivoted between the attitudes shown in FIG. 3. As illustrated by arrow A, the tire support rack 12 can travel between an attitude where the tire 13 is positioned beneath the truck body to an attitude where the tire is positioned beyond the truck bumper 11. In the attitude where the tire is beyond the truck bumper 11, the tire 13 and tire platform 35 can serve as a step for facilitating a person, not shown, climbing into the back of the truck 10 or climbing into a camper carried on the truck, not shown. When in a stowed attitude, as shown best in FIG. 3, it is preferred for safety to lock the tire 13 and the spare tire carrier 12 to the truck frame. Therefore, a safety cable 14 is preferably included as mentioned earlier herein and is shown best in FIG. 3, that includes loop end 14a that is fitted over bolt 37 and maintained thereover by bar 38. The opposite cable end, not shown, is preferably secured to the truck frame, truck bed, truck body, or the like. So arranged, should, for any reason, the spare tire carrier 12 fail, the safety cable 14 will maintain the tire and spare tire carrier to the truck frame until the vehicle can be stopped and repairs made.

The present invention in a spare tire carrier 12 has disclosed a preferred lifting arm assembly 17 as consisting of a bolt 18 turned into a lifting chamber 21 that incorporates, as internal threads therefor, the coil spring 22. It should, however, be obvious that other thread configurations could be appropriate, incorporated with lifting chamber 21, within the scope of this disclosure. Further, while the utilization of a threaded arrangement for lifting cylinder 21 is preferred, it should be obvious that other arrangements such as a hydraulic cylinder, or the like, could be employed for raising or lowering chain 25 appropriately within the scope of this disclosure. Also, while a preferred arrangement for connecting tube support 15 through bumper 11 has been shown and described herein, it should be understood that the tube support 15 could be secured to the vehicle frame by the described structure or other appropriate structure within the scope of this disclosure. Further, while a preferred arrangement of leveling arm 30 has been shown and described herein, it should be understood that the present disclosure is not limited to any particular leveling arm structure and that, as appropriate, leveling arm 30 could be formed as in a single unit within the scope of this disclosure.

It should be understood that the present disclosure in a spare tire carrier is made by way of example and that variations are possible within the scope of this disclosure without departing from the subject matter coming within the scope of the following claims, which claims I regard as my invention.

I claim:
1. A spare tire carrier comprising,
   tube support means for rigid attachment to a vehicle;
   lifting means fitted within said tube support means and arranged for moving vertically therein;
   means for operating said lifting means to move it vertically;
   chain means secured to said lifting means to move therewith;
   a support bar also secured to said chain means and pivotally connected at its ends, respectively, to a lifting pivot block and platform pivot block;
   means for maintaining said lifting pivot block in essentially a stationary attitude;
   tire platform means secured to extend from said platform pivot block for maintaining a spare tire thereon; and
   means arranged between said lifting and platform pivot blocks for limiting rotation of said pivot blocks.
2. A spare tire carrier as recited in claim 1, wherein the tube support means consists of a cylindrical pipe that is secured to and extends through the vehicle rear bumper.
3. A spare tire carrier as recited in claim 1, wherein the lifting means consists of,
   a bolt means supported in and extending from the tube support so as to turn a threaded portion thereof within that tube support means;
   a cylinder fitted within said tube support means that receives said bolt means threaded portion and is connected to the chain means; and
   threaded means arranged within said cylinder wherein the threaded portion of said bolt means is turned such that said cylinder will move vertically when said bolt means is turned appropriately.
4. A spare tire carrier as recited in claim 3, wherein the bolt means is supported through the vehicle bumper and is arranged to be turned manually.
5. A spare tire carrier is recited in claim 3, wherein the cylinder is connected across an end thereof to a link of the chain means; and
   the thread means consist of a coil spring secured within said cylinder.
6. A spare tire carrier as recited in claim 1, wherein the chain means consists of,
   a chain formed from individual chain links that are pivotally connected together and one end of said chain is pivotally connected to the support bar and the other chain end is pivotally connected to the lifting means.
7. A spare tire carrier as recited in claim 1, wherein the means for maintaining said lifting pivot block to a stationary attitude consists of, a guide sleeve arranged to telescope into the tube support means and is secured to the lifting pivot block.

8. A spare tire carrier as recited in claim 1, wherein the tire platform means further includes, means for supporting a spare tire thereon; and safety cable means for releasably maintaining said spare tire and tire platform to said vehicle.

9. A spare tire carrier as recited in claim 1, wherein the means for limiting rotation of the pivot blocks consists of, arm means formed in two sections, with each section pivotally coupled, respectively, to the lifting pivot block and platform pivot block; and length adjustment means for connection between said arm means sections for adjusting the distance therebetween.

10. A spare tire carrier as recited in claim 9, wherein the length adjustment means consist of, a pair of nuts, one each secured to each arm means section end;

a threaded rod turned into said nuts spanning therebetween; and lock means for maintaining a suitable arm means section spacing.

11. A spare tire carrier as recited in claim 10, wherein the lock means consists of, lock nuts turned appropriately on the threaded rod to bind said rod against said arm means sections.

* * * * *